United States Patent [19]

Lacroix

[11] 4,368,029

[45] Jan. 11, 1983

[54] HETEROGENEOUS FLAMELESS HYDROCARBON COMBUSTION CONTACT CATALYST, METHOD OF MAKING SAME AND METHOD FOR COMBUSTION OF HYDROCARBONS

[75] Inventor: Alain Lacroix, Lyons, France

[73] Assignee: Societe Lyonnaise des Applications Catalytiques, Rillieux, France

[21] Appl. No.: 269,816

[22] Filed: Jun. 3, 1981

[30] Foreign Application Priority Data

Jun. 4, 1980 [FR] France .................................. 80 12701

[51] Int. Cl.$^3$ ....................... F23D 13/00; B01J 23/10; B01J 23/34; B01J 23/86
[52] U.S. Cl. ......................................... 431/7; 431/328; 252/455 R; 252/462
[58] Field of Search ................... 252/455 R, 462, 470, 252/471; 431/7

[56] References Cited

U.S. PATENT DOCUMENTS

| | | | |
|---|---|---|---|
| 3,983,072 | 9/1976 | Stephens | 252/471 X |
| 4,177,168 | 12/1979 | Denny et al. | 252/470 |
| 4,189,294 | 2/1980 | Rice et al. | 431/7 |

*Primary Examiner*—W. J. Shine
*Attorney, Agent, or Firm*—Karl F. Ross

[57] ABSTRACT

A heterogeneous catalyst, especially for the flameless combustion of hydrocarbons such as methane, propane and butane, and which is especially effective in obtaining maximum conversion of such hydrocarbons and minimum release of alkenes, contains on a catalyst support, conventional flameless combustion catalysts such as platinum sponge, palladium and active metal oxides. According to the invention the catalyser combination also includes the manganese oxide $Mn_3O_4$ which itself does not have significant catalyst activity.

7 Claims, 1 Drawing Figure

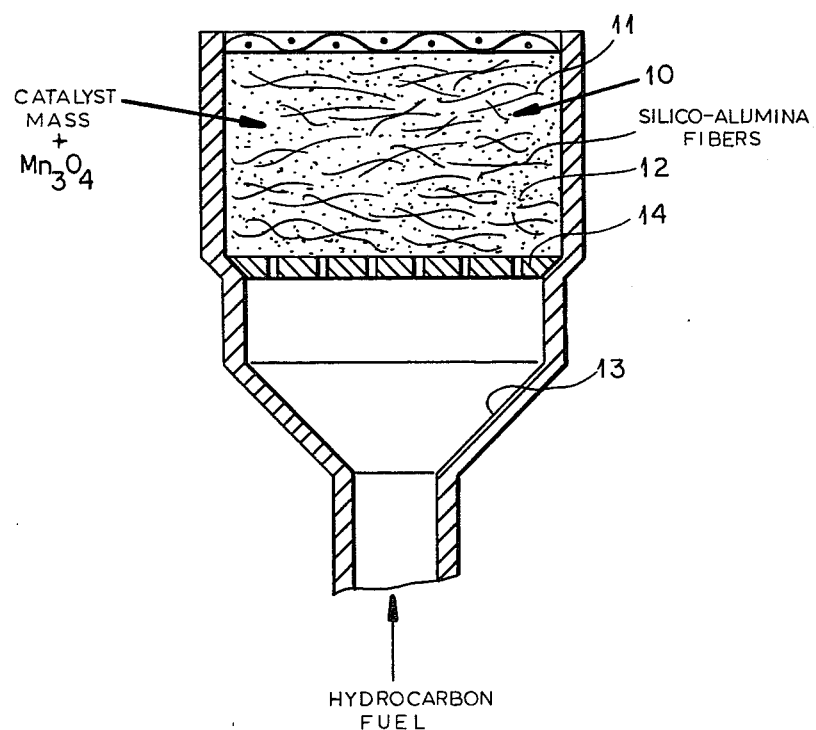

HETEROGENEOUS FLAMELESS HYDROCARBON COMBUSTION CONTACT CATALYST, METHOD OF MAKING SAME AND METHOD FOR COMBUSTION OF HYDROCARBONS

FIELD OF THE INVENTION

My present invention relates to a heterogeneous contact catalyst mass and especially a catalyst position for the flameless combustion of hydrocarbons. The invention also relates to a method of making such a catalyst.

BACKGROUND OF THE INVENTION

Heterogeneous contact catalysts for the flameless combustion of hydrocarbons are widely used wherever substantially complete oxidation of hydrocarbons such as methane, propane and butane are desired, and these hydrocarbons are to be transformed predominantly into mixtures of carbon dioxide and water with a high thermal yield. Typical of the applications of such catalysts is in space heaters, e.g. for recreational vehicles, where ventilation is limited and wherever the actual formation of a flame may pose a problem.

The catalyst mass for such systems generally comprises a catalyser and a support; the support, being capable of withstanding the elevated temperatures at which the fuel-oxygen reaction occurs at the catalyst surface, serves as a distributor for the fuel so that the latter is reasonably uniformly spread into contact with the catalysing surface, mechanically retains the catalysing substances, provides the relatively high surface-area-to-mass or surface-area-to-volume ratios which are required and even in some cases participates in the contact-catalyst action.

It is desirable, where such heterogeneous catalysts are to be utilized in space heating apparatus for producing thermal energy by the flameless oxidation of hydrocarbons, that the reaction take place at relatively low temperatures such that the catalytic effect of the catalysing substances is not adversely affected and the useful life of the catalyst, and the apparatus in which it is incorporated, are prolonged. The most effective catalyser for the purposes described is platinum in a spongy state and spongy platinum has been applied successfully on a large number of supports. Palladium, in a finely divided state, has also been found to be an effective catalyser, also, as applied to a variety of supports.

Since both palladium and platinum are extremely expensive, it has also been proposed to form the catalyser at least in part of substances which are less expensive than these noble metals. For example, one can provide a catalyst mass which includes oxides of elements such as cobalt, cerium, chromium or aluminum, which are activated by or are employed in association with platinum and/or palladium.

Successful catalysers have included:
Platinum-alumina ($Al_2O_3$),
platinum-chromium oxide ($Cr_2O_3$) and cobalt oxide ($Co_2O_3$),
palladium-cerium oxide ($CeO_2$),
platinum-cerium oxide ($CeO_2$), and
platinum-chromium oxide ($Cr_2O_3$).

These catalysts provide good conversions, (i.e. percent hydrocarbons fully transformed into combustion products) when deposited upon a compact support such as upon a layer or bed of silico-alumina fibers.

They are capable of effecting an oxidation of hydrocarbons such as methane, propane, butane or heptane under conditions such that the conversion approaches 100%.

When such catalyst systems are used in heating apparatus or in other systems for the production of thermal energy by catalytic combustion, the catalyst mass is brought to the minimum temperature for a sustained reaction by the ignition of an initial quantity of gas at the surface. This initial flame combustion results in a heating of the catalyst mass to the minimum temperature for sustained flameless combustion, and the temperature is spread throughout the body of the catalyst so that, thereafter, flameless combustion is carried out across the catalyst body.

In other words, while the catalyst mass is being brought to the activation temperatures of the flameless combuster, this reaction develops locally and gradually spreads over the entire active surface of the catalyst mass, the gas being fed continuously to the latter.

While the aforementioned system is comparatively simple and allows catalytic flameless combustion systems to be utilized economically with little skill, there are some disadvantages.

One of these is the inevitable release in existing catalytic heaters of greater or lesser quantities of the uncombusted fuel gas during ignition and as the mass is brought up to temperature.

The volume of the noncombusted fuel gas which is passed or released in a function of the nature of the catalyst support or the catalyst mass itself as well as of the hydrocarbon constituting the fuel.

For example, some catalyst masses result in the generation of alkenes and like unsaturated hydrocarbons such as butene, during the priming or starting of the reaction with saturated hydrocarbon fuels.

Experience has shown that compact texture supports, such as asbestos or silico-alumina fibers, promote release of the noncombusted hydrocarbons into the atmosphere.

OBJECTS OF THE INVENTION

It is the principal object of the present invention to provide an improved heterogeneous contact catalyst mass which is capable of avoiding the aforementioned disadvantages and promoting the attainment of the activation temperature of the mass whereby the release of noncumbusted hydrocarbons is significantly diminished.

Another object of this invention is to provide a method of making an improved contact catalyst for the heterogeneous catalytic combustion of hydrocarbon fuels in a flameless manner.

It is also an object of the invention to provide an improved method of generating heat by the flameless heterogeneous catalytic combustion of the hydrocarbons whereby disadvantages of prior art systems can be avoided.

SUMMARY OF THE INVENTION

These objects and others which will become apparent hereinafter are attained in accordance with the present invention by providing a catalyst mass which comprises, on a catalyser support of compact structure, a catalyser composition which contains, in addition to at least one flameless hydrocarbon combustion catalyst, an effective amount of the manganese oxide $Mn_3O_4$, a compound which has been found to contribute remarkably to the reduction in the liberation of noncombusted hydrocarbons as the catalyser mass is brought up to the activation temperature.

The support for the catalyst of the invention is constituted preferably by a textured fiber compact composed of alumina fibers, silica fibers, silico-alumina fibers or by a compacted, sintered or bonded porous mass of silica or alumina or mixtures thereof.

The remarkable improvements in the catalytic activity of the composition of the present invention are particularly notable when the hydrocarbon fuel contains unsaturated hydrocarbons, e.g. alkenes, such as butene.

The results obtained with the catalyst of the invention are especially surprising because the manganese oxide, alone, does not possess any significant catalytic oxidation activity.

Practical tests, in which catalyst compositions containing the manganese oxide $Mn_3O_4$ were directly compared with other catalyst systems of otherwise identical compositions and catalyser contents, show that it was possible to reduce the emission of uncombusted hydrocarbons of 75%, a phenomenon at least in part believed to be related to far more rapid attainment of the activation temperature of the mass with the system of the present invention than could be obtained with systems without the manganese oxide $Mn_3O_4$.

It has also been found to be advantageous to include in the catalyser component of the mass a recrystallization inhibitor which prevents recrystallization at the operating temperatures and which can be a known recrystallization inhibitor in the form of an oxide of an element having a high electron density.

It has been found to be advantageous to provide a catalyst system in which the ratio by weight of the $Mn_3O_4$ to the support is about $0.033 \pm 0.017$. Under these conditions, the other metal oxides mentioned as active catalysts can be present in ratios to the support of the same order as the manganese oxide and the platinum or palladium activator can be present in amounts ranging between 0.0002 to 0.008, specific compositions of particular effect being found in the examples given below.

According to the invention, the support is immersed in an alcoholic solution containing salts of the catalyser components, e.g. chromium, cobalt, cerium and palladium, and preferably the nitrate salts. The platinum can be in the form of chloroplatinic acid. The support is then dried and subjected to a thermal treatment, e.g. heating in air to transform the platinum to the sponge, release elemental palladium and convert the other elements to the respective oxides. The recrystallization inhibitor can also be incorporated in the solution with which support is impregnated.

BRIEF DESCRIPTION OF THE DRAWING

The above and other objects, features and advantages of the present invention will become more readily apparent from the following description, reference being made to the accompanying drawing in which the sole FIGURE is a diagrammatic section of a system for the catalytic flameless combustion of hydrocarbon according to the invention.

SPECIFIC DESCRIPTION AND EXAMPLES

The system shown in the drawing comprises a catalyst mass 10 consisting of a fiber support 11, e.g. of silico-alumina fibers which has been impregnated and thereby coated uniformly with a catalyser 12 containing, in addition to platinum sponge and/or palladium, at least one oxide selected from the group which consists of chromium oxide, cerium oxide and cobalt oxide, and the manganese oxide $Mn_3O_4$ which reduces the release of noncombustive hydrocarbons and improves the efficiency of the combustion period. A gas supply system 13 delivers the hydrocarbon to the mass and a gas distributor 14 is provided between this feeder and the catalyst mass.

SPECIFIC EXAMPLES

The compositions listed below have been found to be effective when applied to a silica-alumina support with the fibers and the catalyser and the components thereof in the indicated ratio. In all cases the compositions are formed as described below.

EXAMPLE 1

The catalyser is constituted by platinum, the chromium oxide $Cr_2O_3$, the cobalt oxide $Co_2O_3$ and the manganese oxide $Mn_3O_4$. The platinum is present in a weight ratio to the support of 0.0024 to 0.0075 and each of the oxides is present in a weight ratio to the support of the order of 0.0033.

EXAMPLE 2

The catalyser is constituted by platinum, the cerium oxide $CeO_2$ and the manganese oxide $Mn_3O_4$. The platinum is present in a weight ratio to the support of 0.0076, the cerium oxide is present in a weight ratio to the support of 0.028 and the manganese oxide is present in a weight ratio to the support of 0.033.

EXAMPLE 3

The catalyser is constituted by platinum, the chromium oxide $Cr_2O_3$ and the manganese oxide $Mn_3O_4$. The platinum is present in a weight ratio to the support of 0.0024 to 0.0075 and each oxide is present in a weight ratio to the support of about 0.05.

EXAMPLE 4

The catalyser is constituted by palladium, the cerium oxide $CeO_2$ and the manganese oxide $Mn_3O_4$. The palladium is present in a weight ratio to the support of the order of 0.012 and each oxide is present in a weight ratio to the support of 0.05.

EXAMPLE 5

The catalyser is constituted by platinum, palladium, the cerium oxide $CeO_2$ and the manganese oxide $Mn_3O_4$.

The palladium was present in an amount by weight of 0.0071 in ratio to the support. The weight ratio of the platinum to the support was 0.0008 and each oxide was present in a weight ratio to the support of 0.050.

Each catalyst mass was obtained by immersing the silica-alumina fiber support in an alcoholic (ethanolic) solution at 70° to 80° C. containing the nitrate salts of the respective oxides and the platinum or palladium in a solution such as chloroplatinic acid and heating the impregnated mass to form the platinum and palladium in spongy form and the remaining elements of the catalyser as the respective oxides.

Each of the catalysers was tested with hydrocarbon fuel including methane, propane, butane and hexane, with and without added alkene compounds such as ethylene, propylene and butene and the combustion was compared with that of another identical catalyst omitting the $Mn_3O_4$. In each case, the liberation of free hydrocarbon was found to be reduced by at least 75% with the catalyst composition of the invention over the compositions without the $Mn_3O_4$.

Similar results were obtained when a conventional recrystallization inhibitor, originally introduced as a soluble salt in the impregnated solution, was co-crystallized with the catalyst components.

In each case the catalyst composition was found to provide a significant improvement in the conversion of hydrocarbons at comparatively low cost and to promote the attainment of the activation temperature.

I claim:

1. A catalyst mass for the flameless combustion of hydrocarbons comprising a compact texture catalyst support and a catalyser on said support consisting of at least one component capable of heterogeneous catalysis of hydrocarbon combustion and an effective amount of the manganese oxide $Mn_3O_4$, said catalyser being constituted by platinum, chromium oxide $Cr_2O_3$, cobalt oxide $Co_2O_3$ and the manganese oxide $Mn_3O_4$, the platinum being present in a weight ratio to the support of 0.0024 to 0.0075 and each of the oxides being present in a weight ratio to the support of the order of 0.03, the support being constituted by silico-aluminous fibers.

2. A catalyst mass for the flameless combustion of hydrocarbons comprising a compact texture catalyst support and a catalyser on said support consisting of at least one component capable of heterogeneous catalysis of hydrocarbon combustion and and effective amount of the manganese oxide $Mn_3O_4$, said catalyser being constituted by platinum, the cerium oxide $CeO_2$ and the manganese oxide $Mn_3O_4$, the platinum being present in weight ratio to the support of 0.0076, the cerium oxide being present in a weight ratio to the support of 0.028 and the manganese oxide being present in a weight ratio to the support of 0.033.

3. A catalyst mass for the flameless combustion of hydrocarbons comprising a compact texture catalyst support and a catalyser on said support consisting of at least one component capable of heterogeneous catalysis of hydrocarbon combustion and an effective amount of the manganese oxide $Mn_3O_4$, said catalyser being constituted by platinum, the chromium oxide $Cr_2O_3$ and the manganese oxide $Mn_3O_4$, the platinum being present in a weight ratio to the support of 0.0024 to 0.0075 and each oxide being present in a weight ratio to the support of about 0.05 the support being constituted by silico-aluminous fibers.

4. A catalyst mass for the flameless combustion of hydrocarbons comprising a compact texture catalyst support and a catalyser on said support consisting of at least one component capable of heterogeneous catalysis of hydrocarbon combustion and an effective amount of the manganese oxide $Mn_3O_4$, said catalyser being constituted by palladium, the cerium oxide $CeO_2$ and the manganese oxide $Mn_3O_4$, the palladium being present in a weight ratio to the support of the order of 0.012 and each oxide being present in a weight ratio to the support of 0.05.

5. A catalyst mass for the flameless combustion of hydrocarbons comprising a compact texture catalyst support and a catalyser on said support consisting of at least one component capable of heterogeneous catalysis of hydrocarbon combustion and an effective amount of the manganese oxide $Mn_3O_4$, said catalyser is constituted by platinum, palladium, the cerium oxide $CeO_2$ and the manganese oxide $Mn_3O_4$, the palladium being present in an amount by weight of 0.0071 in ratio to the support, the weight ratio of the platinum to the support being 0.0008 and each oxide being present in a weight ratio to the support of 0.050.

6. A method of making the catalyst mass defined in claim 5, comprising the steps of immersing said support in an alcoholic solution containing dissolved metal salts of the said metal oxides and a solution containing said platinum and palladium at a temperature of 70° to 80° C. and thereafter subjecting the support thus impregnated to a thermal treatment capable of liberating platinum and palladium and of transforming other elements of said component and manganese to respective oxides.

7. A method of the heterogeneous contact catalytic combustion of hydrocarbons which comprises reacting said hydrocarbons with oxygen on a catalyst mass as defined in claim 1, claim 2, claim 3, claim 4 or claim 5.

* * * * *